United States Patent [19]

Rapshys

[11] 3,980,952

[45] Sept. 14, 1976

[54] DIPOLE ANTENNA SYSTEM HAVING CONDUCTIVE CONTAINERS AS RADIATORS AND A TUBULAR MATCHING COIL

[75] Inventor: William Rapshys, Palatine, Ill.

[73] Assignee: Motorola, Inc., Schaumburg, Ill.

[22] Filed: Apr. 7, 1975

[21] Appl. No.: 565,329

[52] U.S. Cl. .................................. 325/16; 325/111; 325/119; 325/178; 325/180; 325/365; 343/793; 343/898

[51] Int. Cl.² ......................... H01B 1/38; H01G 9/16

[58] Field of Search ........... 343/898, 793, 820, 822; 325/16, 111, 119, 178, 180, 361, 366, 367, 365

[56] References Cited

UNITED STATES PATENTS

| | | | |
|---|---|---|---|
| 2,657,311 | 10/1953 | Kleis | 343/822 |
| 2,828,413 | 3/1958 | Bowers | 325/361 |
| 3,307,108 | 2/1967 | Induni | 325/119 |
| 3,432,858 | 3/1969 | Brown | 343/822 |
| 3,656,167 | 4/1972 | Lea | 343/793 |

*Primary Examiner*—Robert L. Griffin
*Assistant Examiner*—Michael A. Masinick
*Attorney, Agent, or Firm*—Phillip Melamed; Victor Myer; James Gillman

[57] ABSTRACT

A pager antenna system having two conductive containers which act as radiators and form a dipole antenna is disclosed. A metallic coil constructed of tubular material is positioned between the conductive containers and has a first end electrically connected to one of the containers. The tubular coil forms part of an antenna impedance matching network and also serves as a conduit for wires which interconnect circuit components located in each of the conductive containers. High frequency isolating chokes are connected in series with the interconnecting wires emerging from a second end of the tubular matching coil and prevent these wires from forming low impedance RF paths between the conductive containers. By making the RF impedance matching coil also serve as a conduit for low frequency interconnecting wires, fewer parts are required, the interconnecting wires are shielded from external influences, and low Q chokes can be used by connecting them across points which have a low RF impedance therebetween.

11 Claims, 2 Drawing Figures

DIPOLE ANTENNA SYSTEM HAVING CONDUCTIVE CONTAINERS AS RADIATORS AND A TUBULAR MATCHING COIL

BACKGROUND OF THE INVENTION

The invention relates generally to the field of dipole antennas which are used for radio transmission and reception and which use a conductive container for each of the two dipole radiating elements. These containers are spatially separated and typically the R. F. impedance between them is very high. The dipole elements are excited (fed) by applying therebetween a radio frequency (RF) potential at the desired operating frequency. One advantage of such an antenna is that associated radio components can be mounted inside the conductive containers and therefore are shielded from external capacitances and radiation. Another basic advantage of such a system is that the conductive containers can now serve as part of the external casing of a radio device (transmitter and/or receiver). Thus the need for a separate antenna structure in addition to the radio casing is eliminated and an overall size reduction is obtained.

When a small size radio device is desired, such as in a portable pager, electrical components must be mounted in both conductive containers and interconnecting wires must be provided between the conductive containers. Normally these wires provide interconnecting paths for signals, such as audio and D. C, having frequencies substantially below that of the RF signal to be transmitted (or received).

The radio components (apparatus) in each container will tend to float at the RF potential of their respective containers and hence the interconnecting wires form parallel (shunt) RF impedance paths between the dipole radiating elements. To provide RF isolation between the radiating elements, RF chokes are usually connected in series with these wires. These chokes are effectively connected between the dipole elements and normally must have a high Q value or else the interconnecting wires will seriously load the dipole antenna and decrease its efficiency. The RF impedance which exists, in prior systems, between the points where the isolation chokes are connected is usually not controlled or even considered, and therefore the RF chokes may be connected across points having an extremely high RF impedance therebetween. Thus even high Q chokes may create a serious shunt low impedance path between the radiating elements of the dipole. Prior art dipole antenna systems provide no suitable and predictable RF impedance points for connecting RF isolating chokes. Therefore, very high quality (Q) RF chokes are required to minimize loading effects.

The antenna input impedance between the dipole radiators must be matched to the transmitter (or receiver) impedance. This is usually accomplished by a complex impedance matching network in addition to any associated mechanical support structure, such as an insulated conduit, for the interconnecting wires.

This mechanical support, which may provide some shielding for the wires, also creates an additional shunt R. F. impedance between the dipole elements and therefore decreases the antenna system efficiency. The size and complexity of the prior art systems also suffer because both an impedance matching network and a separate mechanical support structure are used.

SUMMARY OF THE INVENTION

An object of the present invention is to provide an improved and simplified dipole antenna system which overcomes the aforementioned deficiencies.

A more particular object of the invention is to provide an improved dipole antenna system that has a tubular impedance matching coil for providing shielding and a predetermined RF impedance level for the interconnecting wires which pass therethrough.

Another object of the invention is to provide an improved dipole antenna system having conductive containers as the dipole elements and not requiring high Q RF chokes in series with the interconnecting wires which pass therebetween.

A still further object of the invention is to provide an improved antenna system wherein a single structure performs a shielding and mechanical support function for the connecting wires and also performs an antenna input impedance matching function.

In one embodiment of the present invention an improved dipole antenna system for use at predetermined frequencies is provided, comprising: first and second conductive containers being spatially separated and located in fixed positions with respect to one another, and thereby forming an effective input impedance therebetween at said predetermined frequencies; impedance network means for matching said effective input impedance to a predetermined impedance level at said predetermined frequencies; said network means including metallic coil means mechanically disposed and electrically coupled between said containers; radio apparatus for processing radio signals disposed in each of said containers; and at least one wire passing between said containers for electrically interconnecting said radio apparatus, said wire being mechanically disposed adjacent to said coil means while passing between said containers.

Basically, a metallic tubular coil is used as both a support structure (i.e. a conduit) for wires interconnecting electrical components located in two separate conductive containers and as an element in an antenna input impedance matching network. RF bypass capacitors are used to maintain the electrical components at the same RF potential as their respective containers so that neither will electrically interfere with the other. RF chokes are connected in series with the interconnecting wires to provide RF isolation between the electrical components (apparatus) which are located in different containers. The metallic tubular coil shields the interconnecting wires from outside influences. Also, since the coil is part of an antenna impedance matching network, a low (predetermined) RF impedance level is obtained between the interconnecting wires and one of the containers. By connecting the RF isolating chokes between this low impedance level, low Q RF chokes can be used without compromising the antenna performance by creating low impedance paths between the two radiating dipole elements.

BRIEF DESCRIPTION OF THE DRAWINGS

For a more complete understanding of the invention reference should be made to the drawings, in which.

DESCRIPTION OF THE PREFERRED EMBODIMENT OF THE INVENTION

Figure 1:
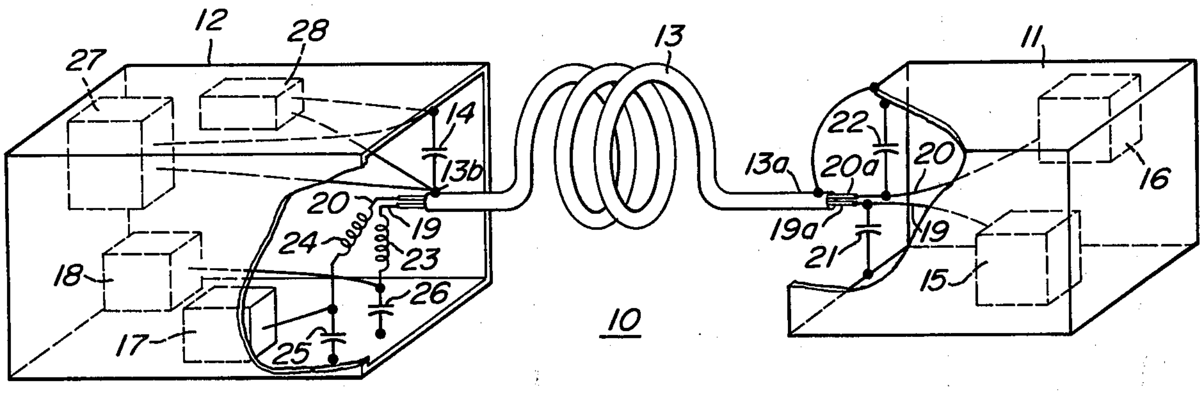
FIG. 1 is a perspective view, with portions removed, of an antenna system constructed in accordance with the present invention.

Referring to FIG. 1, a pager antenna system 10 is illustrated and basically comprises a first conductive container 11, a second conductive container 12, and a tubular metallic coil 13. The container 11 is spatially separated from and located in a fixed position with respect to the container 12, and the tubular metallic coil 13 has a first end 13*a* directly electrically connected to the container 11 and a second end 13*b* electrically connected to the container 12 through a tuning capacitor 14. For clarity, no additional mechanical support structure for coil 13 or containers 11 and 12 is shown in FIG. 1. Conductive containers 11 and 12 are hollow rectangular metallic boxes each having an open end and each is illustrated, for clarity, with a portion thereof removed.

Two electrical radio components 15 and 16, shown in phantom, are disposed within container 11 and two electrical components 17 and 18 are similarly illustrated within container 12. Two interconnecting wires 19 and 20 pass through tubular metallic coil 13 and emerge from ends 13*a* and 13*b*. After emerging from end 13*a*, the wires 19 and 20 are directly connected to components 15 and 16, respectively, and are also RF bypassed to conductive container 11 through capacitors 21 and 22, respectively. It is understood that wires 19 and 20 have corresponding insulating layers 19*a* and 20*a* surrounding them as they pass through metallic coil 13 to prevent any shorting. RF chokes 23 and 24 are connected in series between the wires 19 and 20, after they emerge from end 13*b*, and components 17 and 18, respectively. RF bypass capacitors 25 and 26 are connected between conductive container 12 and the electrical components 17 and 18, respectively.

A transmitter 27, having a 50 ohm output impedance, is disposed in container 12 and has its output connected between the container 12 and the end 13*b* of the metallic coil. A receiver 28, having a 50 ohm input impedance, is also disposed in container 12 and has its input connected between end 13*b* and container 12. The transmitter 27 consists of standard radio circuitry for generating an RF signal which is to be radiated and receiver 28 contains standard circuitry for receiving an RF signal and producing information signals in response thereto.

While FIG. 1 represents a transceiver with both the transmitter and receiver using the same antenna system, the use of either in combination with the invented antenna system is within the scope of this invention. While two interconnecting wires 19 and 20 are illustrated in FIG. 1, the use of any number of interconnecting wires is also within the scope of this invention.

The electrical circuit components 15, 16, 17 and 18 represent such things as resistors, capacitors, inductors, and transistors, which have to be placed in different containers because of total size restrictions on the pager antenna system. These components may be integral parts of either transmitter 27 or receiver 28, even though they are separately illustrated. The electrical components are interconnected for the proper processing of the signals to be transmitted (or received). Thus the component 18 could represent an audio amplifier having its output connected to the component 16 which would represent a speaker.

The bypass capacitors 21, 22, 25 and 26 insure that the electrical components are held at the same RF potential as their respective containers. The chokes 23 and 24 isolate the RF potentials which exist between the components in different containers while permitting a low frequency electrical interconnection.

Figure 2:
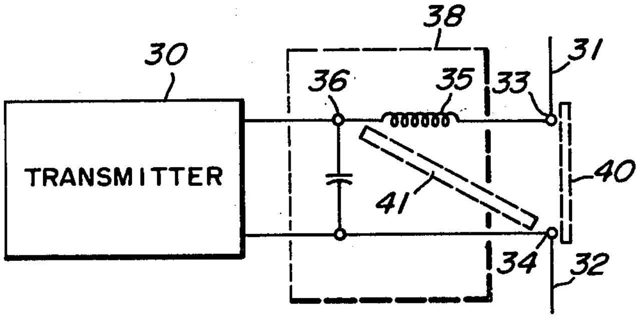
FIG. 2 is a schematic diagram of an equivalent electrical circuit for the antenna system shown in FIG. 1.

Referring to FIG. 2, an equivalent electrical circuit of the inventive antenna system is illustrated in conjunction with a transmitter 30 which has a low output impedance. The dipole radiating elements 31 and 32 are connected to the terminals 33 and 34, respectively, which represent antenna input terminals. An inductor 35 is connected between the terminals 33 and 36, and a capacitor 37 is connected between the terminals 34 and 36. The transmitter 30 produces an RF output signal which is applied between terminals 34 and 36.

Thus the circuit of FIG. 2 illustrates the transmitter 30 connected to a pair of dipole radiators 31 and 32 through an L section network 38, shown dashed, comprising inductor 35 and capacitor 37. The network 38 provides an impedance match between the low transmitter output impedance (between terminals 34 and 36) and the high antenna input impedance (between terminals 33 and 34). The inductor 35 and the capacitor 37 have circuit values which provide the desired impedance match at the operating frequencies of the dipole antenna system.

The dipole radiator 31 corresponds to the first conductive container 11 in FIG. 1 and the radiator element 32 corresponds to the second container 12. The inductor 35 corresponds to the inductance of the metallic tubular coil 13 and the capacitor 37 corresponds to the tuning capacitor 14. The terminals 33 and 36 represent ends 13*a* and 13*b* of the metallic tubular coil, respectively. The transmitter 30 corresponds to the transmitter 27 with both having the same low output impedance, such as 50 ohms.

The effective antenna input impedance between terminals 33 and 34, which is formed by containers 11 and 12 and the separation therebetween, is normally extremely high and therefore any path between these terminals, in addition to the structure shown in FIG. 2, will disrupt the impedance match and decrease the gain of the dipole antenna. Thus a wire 40, shown in phantom, which is adjacent to both terminals 33 and 34 will effectively reduce the impedance level between these terminals because of the induced R. F. potentials thereon. Even if wire 40 consists of an RF choke, the choke is effectively directly in parallel with the antenna input impedance. Thus a low Q choke would significantly load the antenna. A wire 41, also shown in phantom, is illustrated as being adjacent to terminals 34 and 36. This wire will also effectively disturb the antenna system. However, since a low RF impedance (50 ohms) is present between terminals 34 and 36, the RF disruption will not be as severe.

It can be seen that by using the structure shown and described in FIG. 1, the antenna loading effect caused by an interconnecting wire extending between the dipole radiators is minimized and is analogous to the loading by the wire 41 in FIG. 2. The tubular metallic coil 13 has provided an inductance for matching the high antenna input impedance to a low transmitter output impedance. Since the end 13*b* will induce an RF potential on the adjacent interconnecting wires emerging therefrom, the coil 13 also provides a low RF impedance level between the interconnecting wires and the container 12. Thus low Q RF chokes can be connected without materially affecting the impedance match or gain of the antenna system. While coil 13 is preferably tubular, if the interconnecting wires are wound around the exterior of the coil, a suitable impedance level can also be obtained since the interconnecting wires are still adjacent to the coil. The tubular coil 13 provides structural support and also RF shielding for the interconnecting wires.

For optimum results, the bypass capacitors 21 and 22 should be connected to wires 19 and 20 close to the coil end 13*a* and the chokes 23 and 24 should be attached close to the end 13*b*. By running the interconnecting wires through the tubular metal coil 13, the effects of stray capacity on the interconnecting wires have been minimized by the shielding of coil 13 and a low RF impedance level is obtained between container 12 and the interconnecting wires emerging from end 13*b*.

While I have shown and described specific embodiments of this invention, further modifications and improvements will occur to those skilled in the art. All such modifications which retain the basic underlying principles disclosed and claimed herein are within the scope of this invention.

I claim:

1. An improved dipole antenna system for use at predetermined frequencies, comprising:

first and second conductive containers being spatially separated and located in fixed positions with respect to one another, and thereby forming an effective input impedance therebetween at said predetermined frequencies;

impedance network means for matching said effective input impedance to a predetermined impedance level at said predetermined frequencies;

said network means including metallic coil means mechanically disposed and electrically coupled between said containers;

radio apparatus for processing signals disposed in each of said containers; and at least one wire means passing between said containers for electrically interconnecting said radio apparatus at frequencies substantially below said predetermined frequencies, said wire means being mechanically disposed adjacent to said coil means while passing between said containers.

2. An improved dipole antenna system according to claim 1 wherein said metallic coil means comprises metallic tubing having first and second ends each being located adjacent to one of said containers respectively, and wherein said wire means passes through said tubing and emerges from said first and second ends.

3. An improved dipole antenna system according to claim 2 wherein said first end of said tubing is directly electrically connected to said first container.

4. An improved dipole antenna system according to claim 3 wherein said impedance network means includes a tuning capacitor connected between said second end of said tubing and said second container, said coil means and said tuning capacitor comprising an L-section of said matching network means.

5. An improved dipole antenna system according to claim 4 which includes, RF bypass capacitor means connected between said first container and said wire means emerging from said first end of said tubing, and RF choke means connected in series between said wire means emerging from said second end and said radio apparatus disposed in said second container.

6. An improved dipole antenna system for use at predetermined frequencies, comprising:

first and second conductive containers being spatially separated and located in fixed positions with respect to one another, and thereby forming an effective input impedance therebetween at said predetermined frequencies;

impedance network means for matching said input impedance to a predetermined impedance level at said predetermined frequencies;

said network means including a tuning capacitor and metallic coil means;

said coil means comprising tubing mechanically disposed between said containers and having a first end directly electrically connected to and located adjacent to said first container, and a second end located adjacent to said second container and connected thereto by said tuning capacitor;

radio apparatus for processing signals disposed in each of said containers;

at least one wire passing through the tubing of said coil means and emerging from said first and second ends for electrically interconnecting said radio apparatus;

first RF bypass means connected between said first container and said wire emerging from said first end of said tubing;

RF choke means connected in series between said wire emerging from said second end and said radio apparatus disposed in said second container; and second RF bypass means directly connected to said second container and connected through said RF chokes means to said wire emerging from said second end.

7. An improved dipole antenna system according to claim 6 wherein said radio apparatus includes a transmitter connected between said second container and said second end.

8. An improved dipole antenna system according to claim 6 wherein said radio apparatus includes a receiver connected between said second container and said second end.

9. An improved dipole antenna system according to claim 6 wherein said first and second containers are metallic substantially rectangularly shaped boxes.

10. An improved dipole antenna system according to claim 6 wherein said predetermined impedance level is 50 ohms.

11. An improved dipole antenna system for use at predetermined frequencies, comprising:

first and second conductive containers being spatially separated and located in fixed positions with respect to one another, and thereby forming an effective input impedance therebetween at said predetermined frequencies;

impedance network means for matching said effective input impedance to a predetermined impedance level at said predetermined frequencies;

said network means including metallic coil means mechanically disposed and electrically coupled between said containers;

radio apparatus for processing signals disposed in each of said containers;

at least one wire passing between said containers for electrically interconnecting said radio apparatus, said wire being mechanically disposed adjacent to said coil means while passing between said containers;

said metallic coil means comprising metallic tubing having first and second ends each being located adjacent to said first and second containers respectively, and said wire passing through said tubing and emerging from said first and second ends;

said first end of said tubing directly electrically connected to said first container;

RF bypass capacitor means connected between said first container and said wire emerging from said first end of said tubing; and RF choke means connected in series between said wire emerging from said second end and said radio apparatus disposed in said second container.

* * * * *